No. 720,563. PATENTED FEB. 17, 1903.
R. N. CHAMBERLAIN.
STORAGE BATTERY SYSTEM.
APPLICATION FILED OCT. 17, 1901.
NO MODEL.

Witnesses:
E. A. Volk
F. F. Lehninger

R. N. Chamberlain Inventor.
By Wilhelm Bonner
Attorneys.

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y., A CORPORATION OF WEST VIRGINIA.

STORAGE-BATTERY SYSTEM.

SPECIFICATION forming part of Letters Patent No. 720,563, dated February 17, 1903.

Application filed October 17, 1901. Serial No. 78,945. (No model.)

*To all whom it may concern:*

Be it known that I, RUFUS N. CHAMBERLAIN, a citizen of the United States, and a resident of Depew, in the county of Erie and State of New York, have invented a new and useful Improvement in Storage Batteries, of which the following is a specification.

This invention relates to that class of storage batteries which are provided with a switch mechanism by which end cells or groups of end cells can be cut in or out. In the end-cell switches heretofore used the arrangement of parts is usually such that the element or group of elements which is cut in or out is short-circuited temporarily through a resistance, because in order to prevent any interruption of the current the last element or group of elements which furnishes current must remain included in the main circuit until the next element or group of elements comes into action. This resistance is so arranged that the circuit is established temporarily through the same as the switch is shifted from one cell or group of cells to the next. When the resistance is comparatively small, it permits of an abnormally large discharge temporarily from the element or group of elements which is being cut in or out, and this causes a rapid deterioration of the end cells. When the resistance is high, it causes a temporary lowering of the voltage, which is overcome when contact with the next element or group of elements is established. These fluctuations of voltage are particularly objectionable in lighting plants, and it has therefore been the general practice to make the resistance small, which practice is in favor of a more constant voltage, but unfavorable to the life of the battery. My invention is designed to avoid these difficulties.

Figure 1:
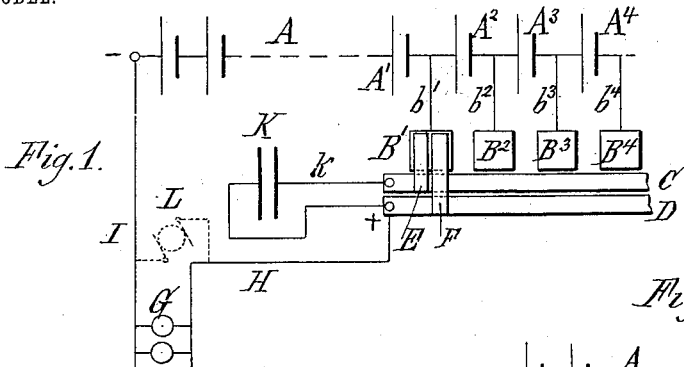
Figure 3:
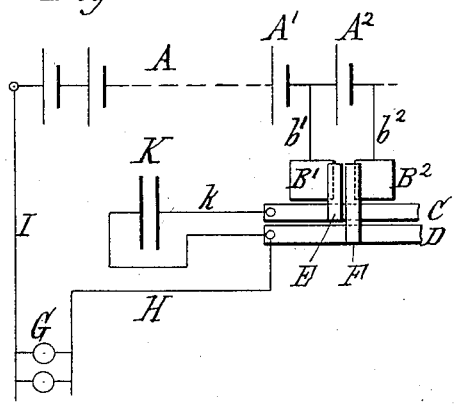
Figure 5:
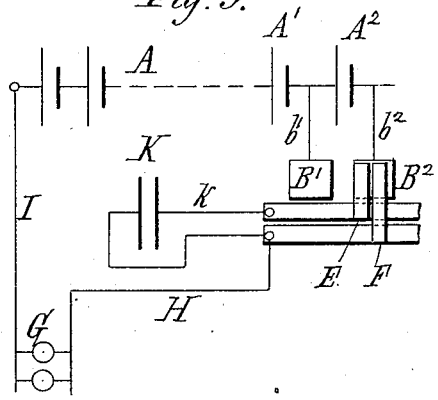
Figure 2:
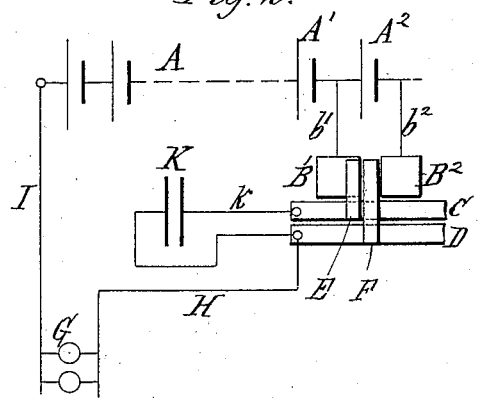
Figure 4:
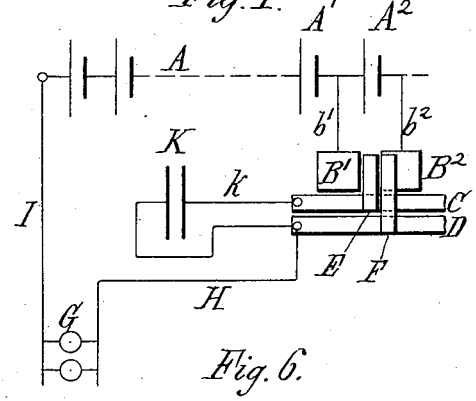
Figure 6:
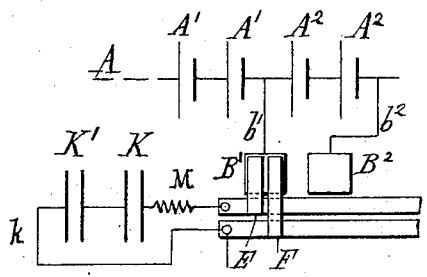

In the accompanying drawings, Figure 1 is a diagrammatic view of a battery embodying my invention. Figs. 2, 3, 4, and 5 are similar views showing the contacts of the switch in different positions. Fig. 6 is a similar view showing a modified arrangment of the parts.

Like letters of reference refer to like parts in the several figures.

Referring to Figs. 1 to 5, A represents the main bank of cells of the battery; $A' A^2 A^3 A^4$, the end cells; $B' B^2 B^3 B^4$, the contact-plates of the end cells, and $b' b^2 b^3 b^4$ the wires connecting the end cells with the contact-plates. C and D represent the parallel switch-bars arranged along the series of contact-plates. E and F represent the switch contacts or brushes, which are movably mounted, respectively, on the bars C and D and operated by any suitable mechanism. These contacts are electrically connected with these bars, but insulated from each other, as usual. G is the translating apparatus—for instance, a series of lights; H, the conductor or wire leading from the switch-bar D to the lighting apparatus, and I the conductor or wire leading from the latter to the negative pole of the battery. All of these parts may be of any suitable or well-known construction.

$k$ is the conductor or wire connecting the switch-bars C and D, and K is a counter-electromotive-force cell or polarization-cell which is arranged in said conductor. This cell is of such a nature that its counter electromotive force is as nearly as possible equal to the available voltage of one of the end cells and is conveniently composed of two lead plates of the proper size arranged in an electrolyte composed of diluted sulfuric acid.

When a generator is used in connection with the storage battery, the generator L may be connected with the conductors H and I, as indicated by dotted lines in Fig. 1.

The operation is as follows, assuming that the switch-bar D is connected with the positive pole of the battery: In the position of the parts shown in Fig. 1 both switch-contacts E and F make contact with the contact-plate B' of the first end cell A', and the counter-electromotive-force cell K is short-circuited, and therefore inactive. The current passes directly from the end cell A' and contact-plate B' through the contact F to the switch-bar D and thence through the translating apparatus to the negative pole of the battery. If the next end cell $A^2$ is to be cut in, the switch-contacts E and F are simultaneously moved to the next contact-plate $B^2$. In the position of the parts shown in Fig. 2 the contact F has left the plate B' and has not yet reached the plate $B^2$ and the contact E is still in contact with the plate B'. The current now passes from the plate B' through the contact E, the conductor $k$, and the counter-electromotive-force cell K to the switch-bar D, and thence onward to the translating apparatus. In this position of the parts the cell K is included in the circuit and acts as a connection or bridge between the switch-bars C and D, offering but little resistance to the passage of the current, as the surface of the electrodes can be made so large that no perceptible drop of voltage takes place by cutting this cell in. In the position of the parts shown in Fig. 3 the contact F has made contact with the plate $B^2$ and the contact E is still in contact with the plate B'. In this position of the parts the counter electromotive force of the cell K performs the important function of preventing a local discharge of the end cell $A^2$, which has just been cut into the circuit. The cell K is connected with the end cell $A^2$ by the contact E in parallel, and the current now passes directly from the plate $B^2$ through the contact F to the switch-bar D, since the counter electromotive force of the cell K permits practically no current to flow through the same. In the position of the parts represented in Fig. 4 the contact F makes contact with the plate $B^2$ and the contact E has left the plate B'. The cell K is therefore cut out and out of action. In the position of the parts shown in Fig. 5 both contacts E and F make contact with the plate $B^2$ and the cell K is short-circuited, as in the position of the parts shown in Fig. 1, in which position this cell is inactive.

When a single counter-electromotive-force cell is not sufficient, two or more may be employed. In the arrangement of the parts shown in Fig. 6 two such cells K and K' are arranged between the switch-bars C and D, and the end cells are arranged in groups of two cells each, the first group A' A' being connected with the plate B' by the wire $b'$, the second group $A^2 A^2$ with the plate $B^2$ by the wire $b^2$, and so on.

In any case the maximum polarization effect presented by the polarization-cell should be substantially equal to the electromotive force of the end-cell section across which it is connected, whether such section includes one or more cells.

A small resistance M may be arranged in the conductor $k$, as shown in Fig. 6; but this is not ordinarily necessary.

I claim as my invention—

1. The combination with the storage battery, the end cells, the end-cell switch and a circuit connected to the storage battery through said switch, of a polarization cell or cells connected between the two sides of said end-cell switch and having a counter electromotive force substantially equal to the electromotive force of the end-cell sections included between successive positions of the switch, substantially as set forth.

2. The combination with end cells, contact-plates connected therewith, movable switch-contacts adapted to make contact with said plates, and switch-bars on which said contacts are adapted to be moved, of one or more polarization-cells arranged in a conductor connecting said switch-bars, and having a counter electromotive force substantially equal to the electromotive force of the sections included between successive positions of the end-cell switch, substantially as set forth.

Witness my hand this 9th day of October, 1901.

RUFUS N. CHAMBERLAIN.

Witnesses:
EDWARD WILHELM,
JNO. J. BONNER.